(12) United States Patent
Doden

(10) Patent No.: US 11,642,618 B2
(45) Date of Patent: May 9, 2023

(54) OIL SUMP TUBE

(71) Applicant: SULLAIR, LLC, Michigan City, IN (US)

(72) Inventor: Ralph Doden, Michigan City, IN (US)

(73) Assignee: SULLAIR, LLC, Michigan City, IN (US)

(*) Notice: Subject to any disclaimer, the term of this patent is extended or adjusted under 35 U.S.C. 154(b) by 0 days.

(21) Appl. No.: 17/760,710

(22) PCT Filed: Sep. 18, 2019

(86) PCT No.: PCT/US2019/051769
§ 371 (c)(1),
(2) Date: Mar. 15, 2022

(87) PCT Pub. No.: WO2021/054951
PCT Pub. Date: Mar. 25, 2021

(65) Prior Publication Data
US 2022/0341425 A1   Oct. 27, 2022

(51) Int. Cl.
*B01D 50/20* (2022.01)
*B01D 46/00* (2022.01)
(Continued)

(52) U.S. Cl.
CPC ......... *B01D 50/20* (2022.01); *B01D 46/0039* (2013.01); *B01D 46/0047* (2013.01);
(Continued)

(58) Field of Classification Search
CPC ............ B01D 46/0031; B01D 46/0039; B01D 46/0047; B01D 50/00; B01D 50/20; B04C 2009/004
See application file for complete search history.

(56) References Cited

U.S. PATENT DOCUMENTS

| | | | |
|---|---|---|---|
| 4,015,960 A * | 4/1977 | Nutter | .................... B01D 50/00 55/318 |
| 4,906,264 A | 3/1990 | Szymaszek et al. | |
| | | (Continued) | |

FOREIGN PATENT DOCUMENTS

| | | |
|---|---|---|
| DE | 3703271 C1 * | 2/1987 |
| EP | 1586361 A1 | 10/2005 |

OTHER PUBLICATIONS

Patent Cooperation Treaty, International Search Report, Application No. PCT/US2019/051769, dated Nov. 12, 2019, in 2 pages.
(Continued)

*Primary Examiner* — Robert Clemente
(74) *Attorney, Agent, or Firm* — Procopio, Cory, Hargreaves & Savitch LLP

(57) ABSTRACT

A separator tank and a gas compressor having a separator tank are provided. The separator tank includes a tank body defining an inner volume, a tank inlet pipe providing fluid communication with the inner volume of the tank body, wherein the tank inlet pipe tangentially penetrates the tank body and is oriented to direct fluid entering the tank body in a spiral fluid flow pathway, and a sump tube positioned to collect fluid flowing within the tank body, the sump tube comprising a vertically oriented opening oriented to align and capture fluid flowing along the spiral fluid flow pathway.

12 Claims, 20 Drawing Sheets

(51) Int. Cl.
  *B04C 9/00*      (2006.01)
  *B01D 50/00*     (2022.01)
  *F04C 29/02*     (2006.01)

(52) U.S. Cl.
  CPC ........ *B01D 50/00* (2013.01); *B04C 2009/004* (2013.01); *F04C 29/026* (2013.01)

(56) References Cited

U.S. PATENT DOCUMENTS

| | | |
|---|---|---|
| 5,676,717 A | 10/1997 | Cope et al. |
| 2004/0175268 A1 | 9/2004 | Raymond |
| 2014/0251142 A1* | 9/2014 | Firnhaber .............. B01D 50/20 95/271 |

OTHER PUBLICATIONS

Patent Cooperation Treaty, Written Opinion, Application No. PCT/US2019/051769, dated Nov. 12, 2019, in 5 pages.

Barry, et al. "Effect of hydroacoustic cavitation treatment on the spiral processing of bituminous coal." International Journal of Coal Preparation and Utilization 35.2 (Mar. 4, 20105): 76-87. Entire Document.

Patent Cooperation Treaty, International Preliminary Report on Patentability, Application No. PCT/US2019/051769, dated Mar. 15, 2022, in 7 pages.

* cited by examiner

OIL SUMP TUBE

BACKGROUND

Field

The present disclosure relates generally to separator tanks, and in particular to a separator tank having an oil sump tube to provide improved oil flow to an air compressor.

Related Art

Separation tanks are often used in the related art with compressor installations in order to allow lubricating fluids to be removed from compressor fluids. For example, separation tanks in the related art may be used to separate lubricating oils from the compressed gas stream in gas compressor installations. Such separator tanks are often designed to withstand high compressor fluid pressures and are often constructed with thick side-walls in order to withstand the necessary pressures. The separation of the lubricating fluids from the compressor fluids is often achieved by a multistage operation.

For example, in the related art, separation of the compressed gas from the liquid oil may be done using a first stage of separation relying on centrifugal force of the oil spinning around the circumference of the cylindrical separation tank. As illustrated in FIGS. 13A, 13B, 14A, and 14B (discussed in greater detail below as a comparative example), a combined fluid stream of compressor gas and lubricating oil enters a cylindrical tank tangentially to the curvature of the tank. Centripetal action causes the heavier oil to move toward the outside side of the tank, while the lighter air moves inboard and out thru a filter or separator element (stage 2). The oil, which is heavier than the gas, may then drop to the bottom due to gravitation force and be collected by a vertical sump tube for recirculation in the compressor system. However, in the related art systems there may be a drop in oil pressure as oil pools or collects in the bottom of the cylinder, rather than continuing to spin. This pressure drop can result in a loss of significant kinetic energy loss as the oil pools or collects and is withdrawn through the vertical sump tube in the bottom of the tank.

SUMMARY

Aspects of the present application may include a separator tank for a gas compressor. The separator tank may include a tank body defining an inner volume, a tank inlet pipe providing fluid communication with the inner volume of tank body, wherein the tank inlet pipe tangentially penetrates the tank body and is oriented to direct fluid entering the tank body in a spiral fluid flow pathway, and a sump tube positioned to collect fluid flowing within the tank body, the sump tube comprising a vertically oriented opening oriented to align and capture fluid flowing along the spiral fluid flow pathway.

Further aspects of the present application may include a separator tank, wherein the sump tube includes a chamfered region surrounding the vertically oriented opening that forms a funnel shape to allow fluid to enter the vertically oriented opening and compress as fluid flows into the sump tube.

Additional aspects of the present application may include a separator tank, wherein the vertically oriented opening of the sump tube is vertically offset from the tank inlet pipe.

Still further aspects of the present application may include a separator tank, wherein the tank inlet pipe is located in an upper half of the tank body, and wherein the vertically oriented opening is located in a lower half of the tank body.

Additional aspects of the present application may include a separator tank, further comprising a separator element located within the inner volume defined by the tank body, wherein the separator element is positioned within the tank body such that the spiral fluid flow pathway is located between the separator element and the tank body.

Further, aspects of the present application may include a separator tank, wherein the vertically oriented opening is positioned within the tank body vertically below the separator element.

Still further, aspects of the present application may include a fluid compression system. The fluid compression system may include a gas compressor, and a separator tank fluidly communicating with the gas compressor. The separator tank including a tank body defining an inner volume, a tank inlet pipe providing fluid communication between the gas compressor and the inner volume of the tank body, wherein the tank inlet pipe tangentially penetrates the tank body and is oriented to direct fluid entering the tank body in a spiral fluid flow pathway, and a sump tube positioned to collect fluid flowing within the tank body, the sump tube comprising a vertically oriented opening oriented to align and capture fluid flowing along the spiral fluid flow pathway.

Additional aspects of the present application may include a fluid compression system, wherein the sump tube includes a chamfered region surrounding the vertically oriented opening that forms a funnel shape to allow fluid to enter the vertically oriented opening and compress as fluid flows into the sump tube.

Further aspects of the present application may include a fluid compression system, wherein the vertically oriented opening of the sump tube is vertically offset from the tank inlet pipe.

Still further aspects of the present application may include a fluid compression system, wherein the tank inlet pipe is located in an upper half of the tank body, and wherein the vertically oriented opening is located in a lower half of the tank body.

Additional aspects of the present application may include a fluid compression system, further comprising a separator element located within the inner volume defined by the tank body, wherein the separator element is positioned within the tank body such that the spiral fluid flow pathway is located between the separator element and the tank body.

Further aspects of the present application may include a fluid compression system, wherein the vertically oriented opening is positioned within the tank body vertically below the separator element.

BRIEF DESCRIPTION OF THE DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

Figure 1:
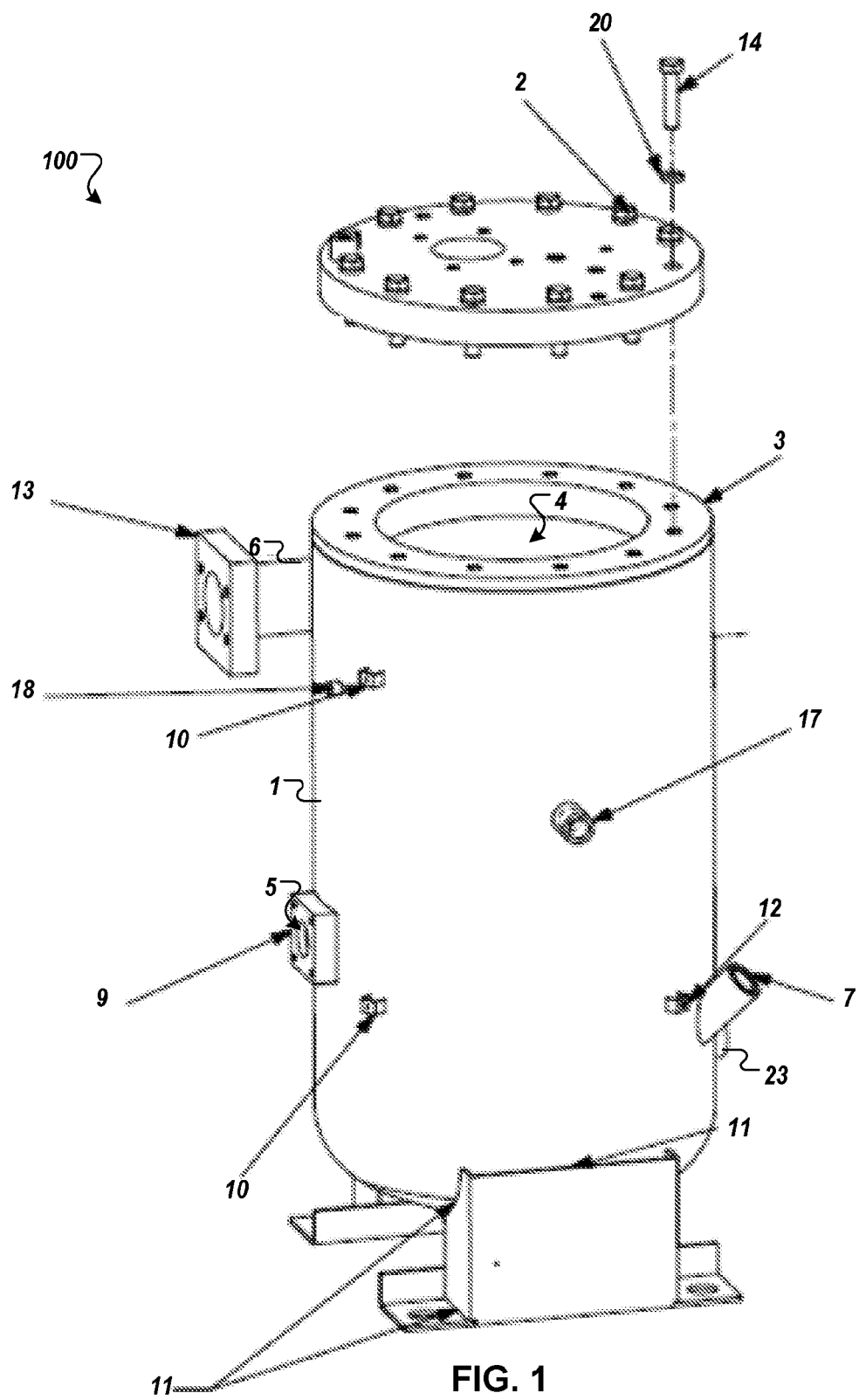
FIG. 1 is an exploded, perspective view generally illustrating a separator tank in accordance with an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

In some example implementations of the present disclosure, a drop in oil pressure at the bottom of a separator tank may be reduced, and kinetic energy of the circulating oil converted into potential energy, by orienting an inlet funnel of the sump tube to face a swirling stream of oil spinning within the separator tank. Additionally, by minimizing the drop in oil pressure, a similar drop in air pressure from the compressor can also be reduced.

Figure 2:
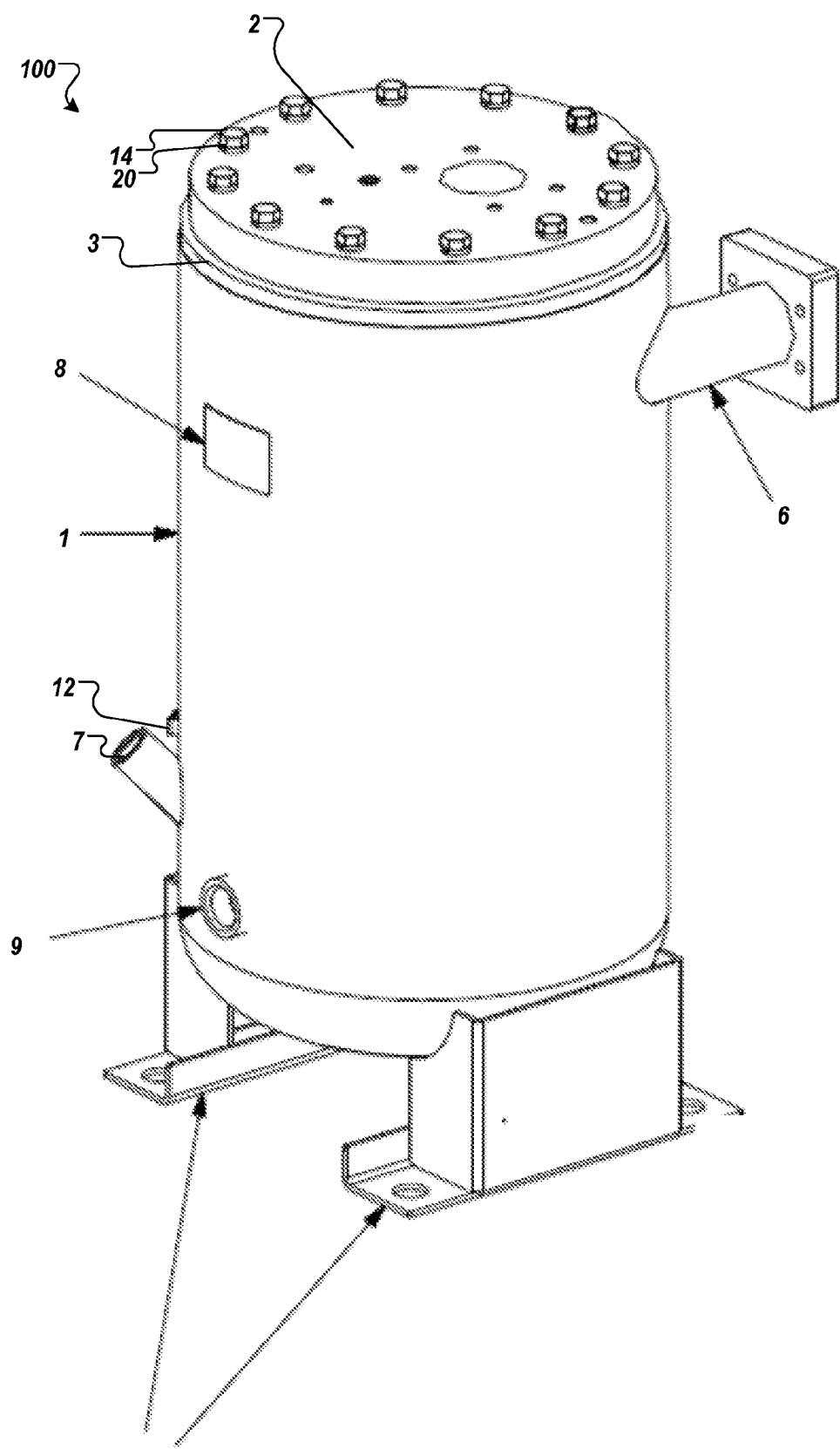
FIG. 2 is a perspective view illustrating a first example implementation of the separator tank in accordance with the example implementation of FIG. 1.
Figure 3:
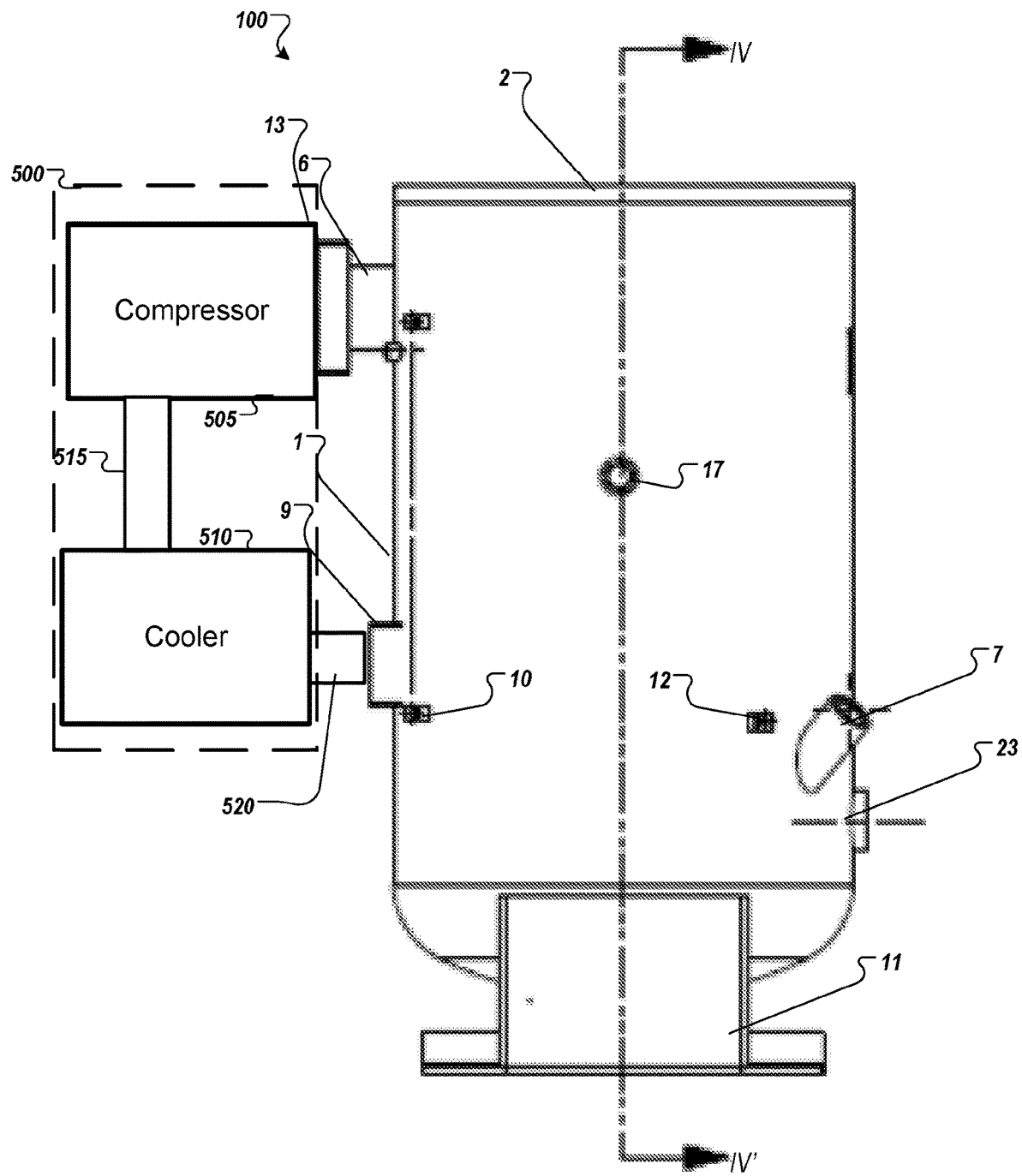
FIG. 3 is a side view illustrating the separator tank in accordance with the example implementation of FIG. 1.
Figure 4:
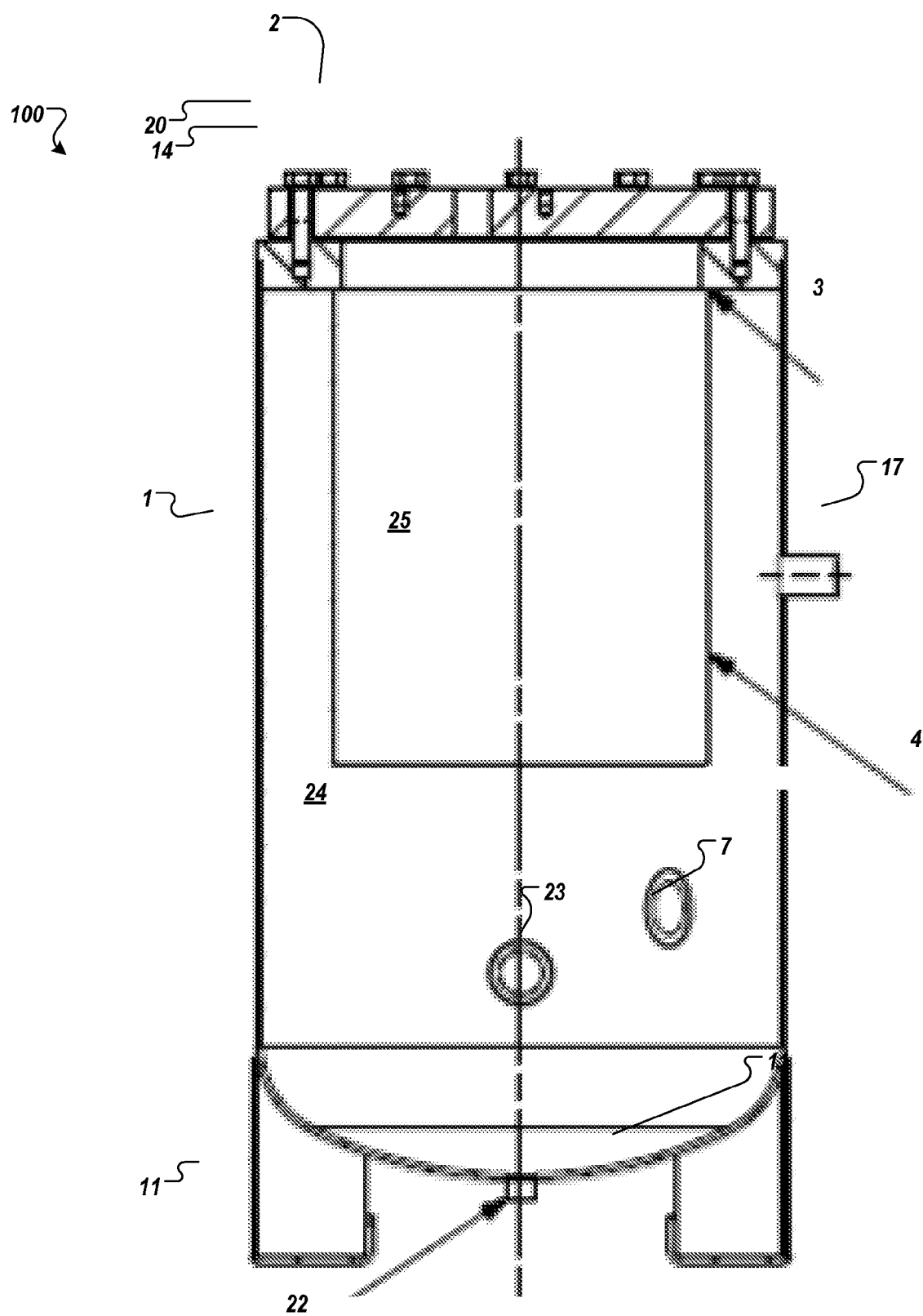
FIG. 4 is a sectional view of the separator tank taken along plane IV-IV' of FIG. 3.
Figure 5:
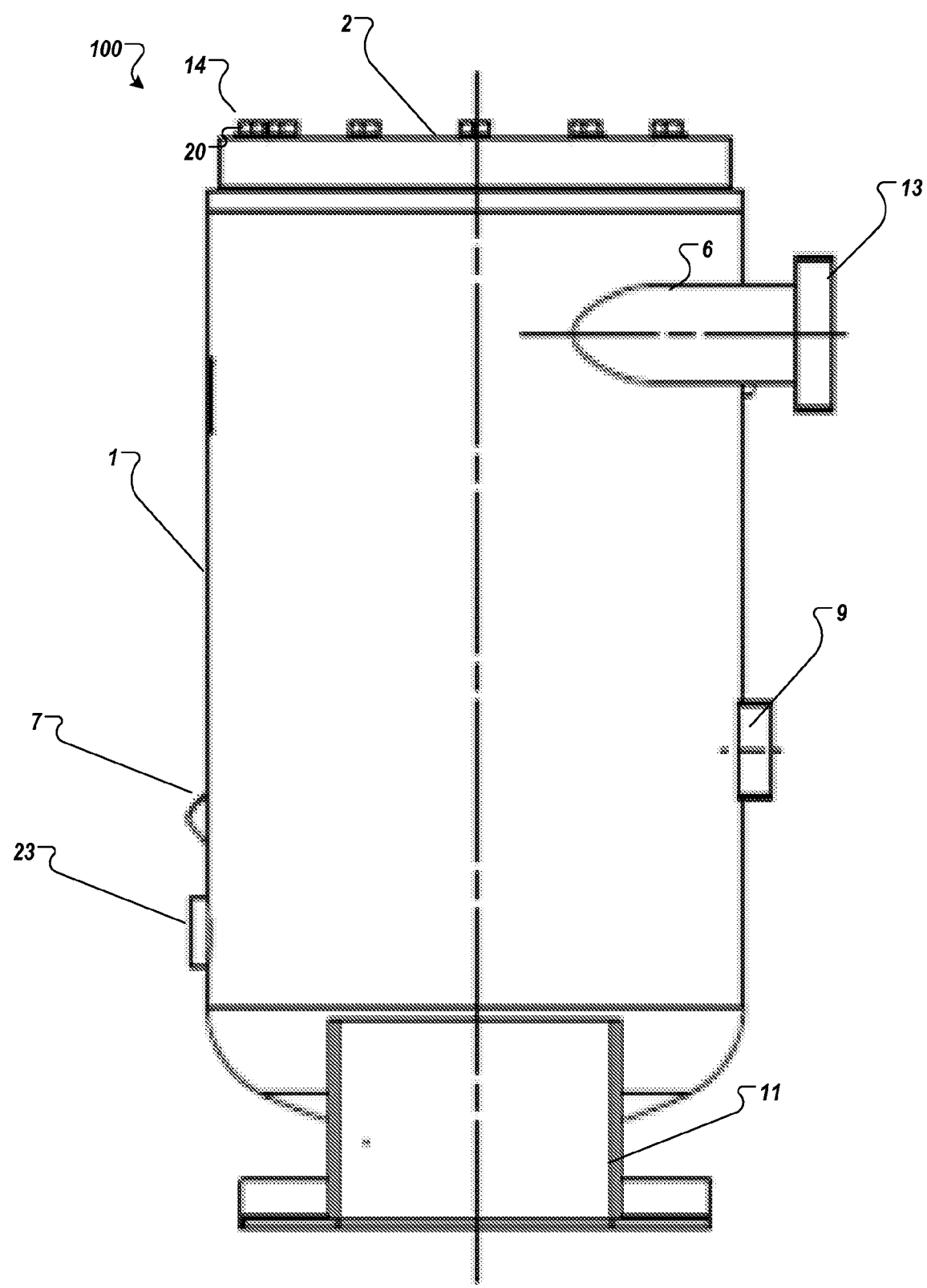
FIG. 5 is another side view illustrating the separator tank in accordance with the example implementation of FIG. 1.
Figure 6:
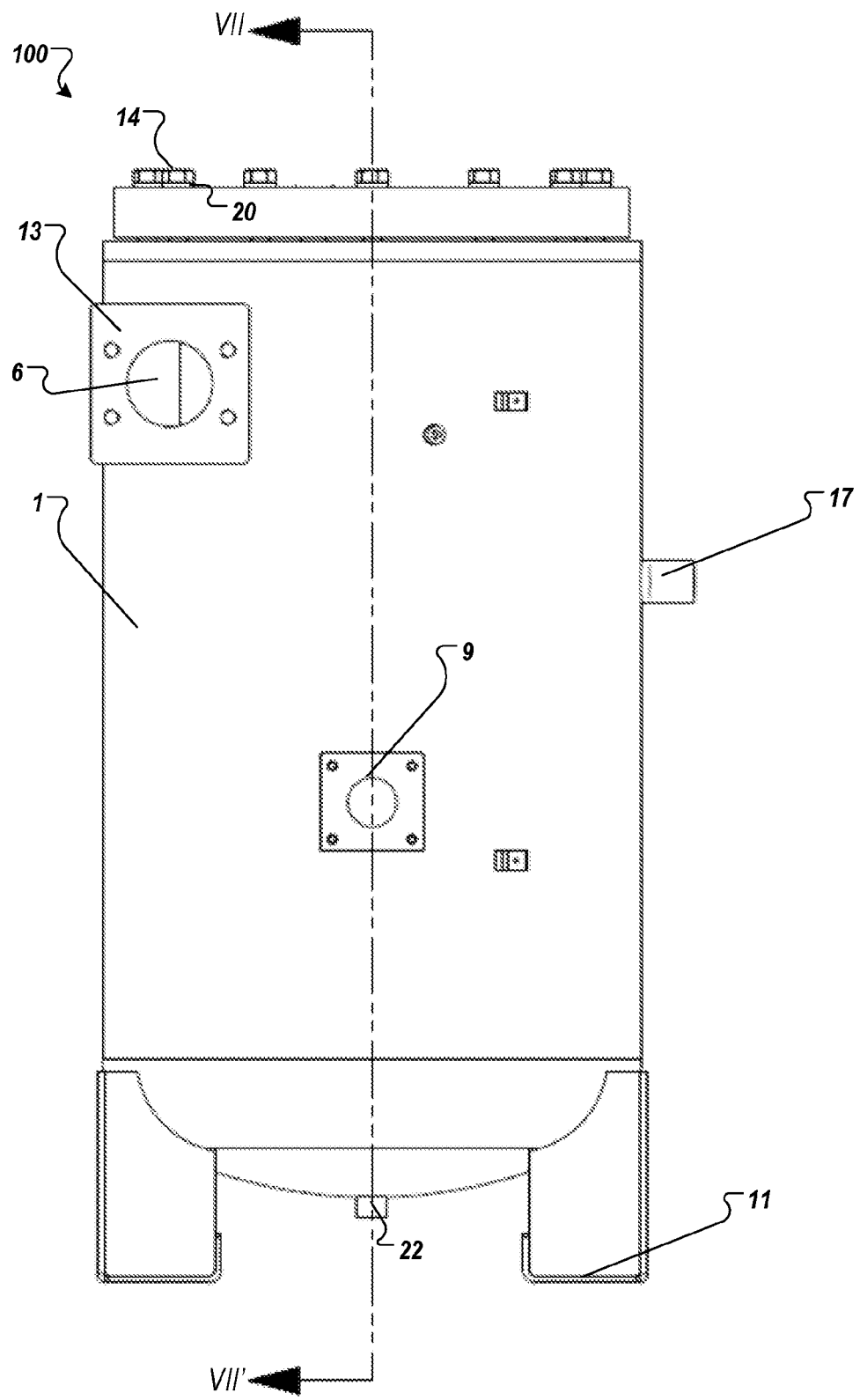
FIG. 6 is a rear view illustrating the separator tank in accordance with the example implementation of FIG. 1.
Figure 7:
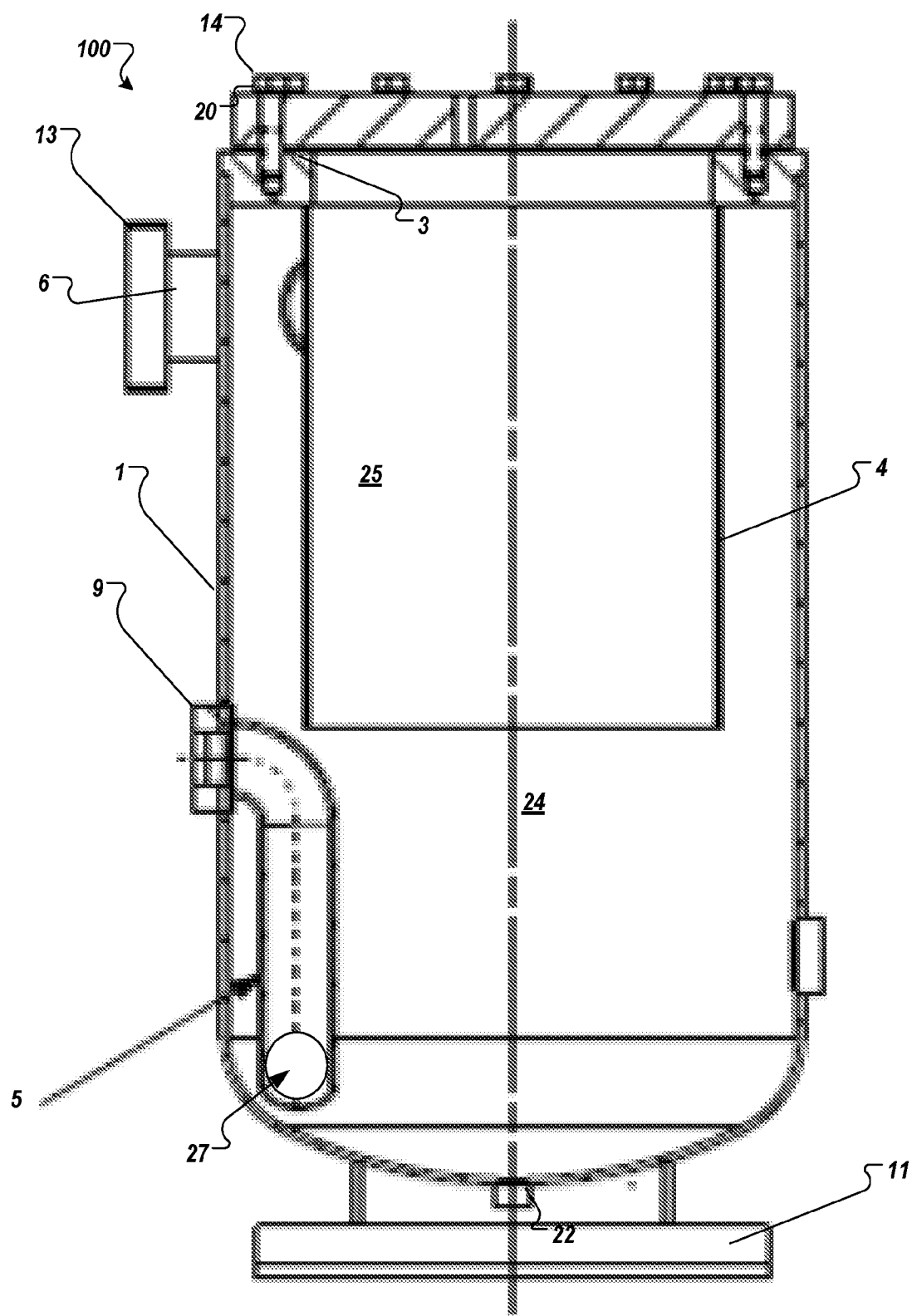
FIG. 7 is a sectional view of the separator tank taken along plane VII-VII' of FIG. 6.
Figure 8:
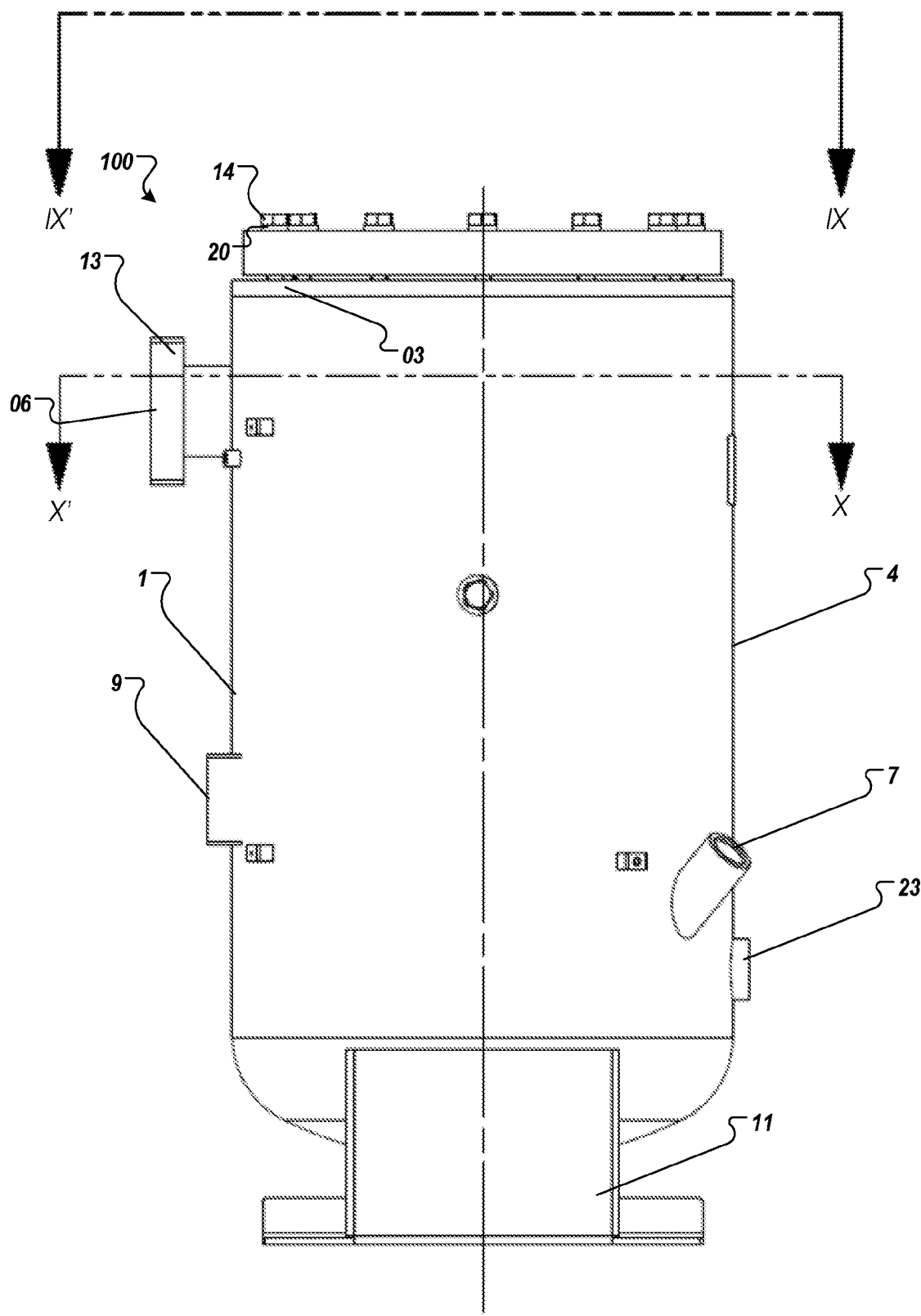
FIG. 8 is a front view illustrating the separator tank in accordance with the example implementation of FIG. 1.
Figure 9:
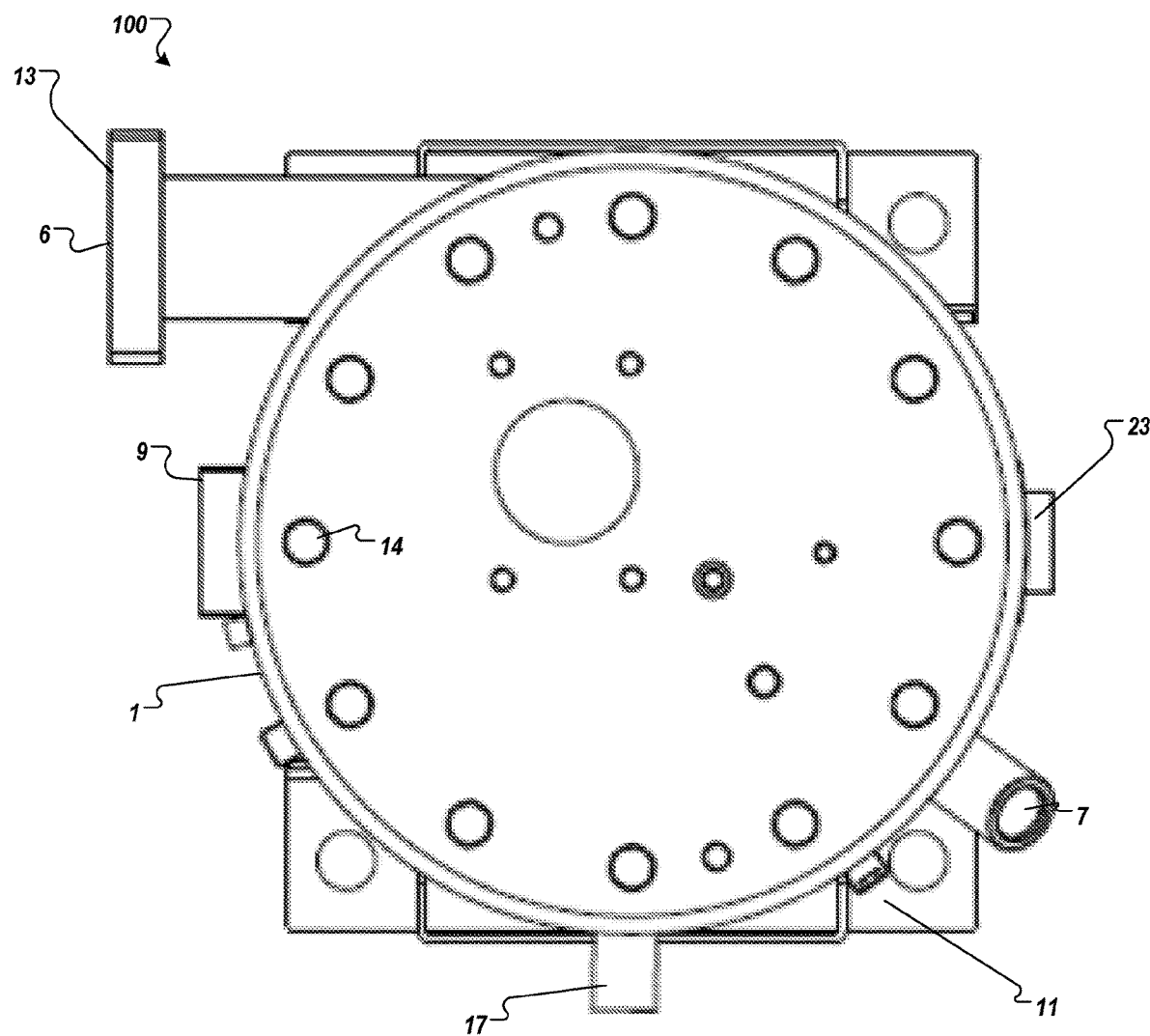
FIG. 9 is a top view of the separator tank taken along plane IX-IX' of FIG. 8.
Figure 10:
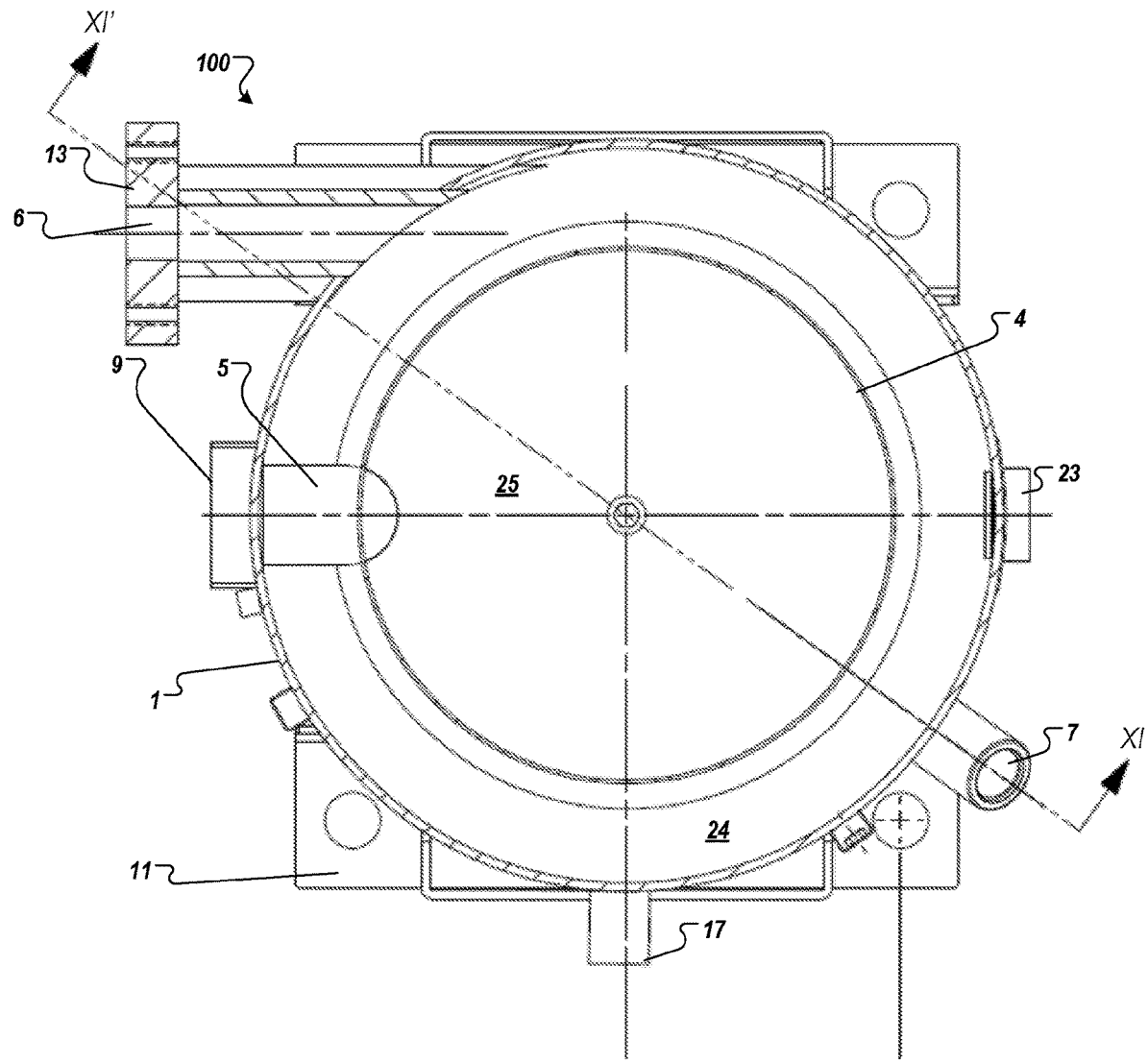
FIG. 10 is a sectional view of the separator tank taken along plane X-X' of FIG. 8.
Figure 11:
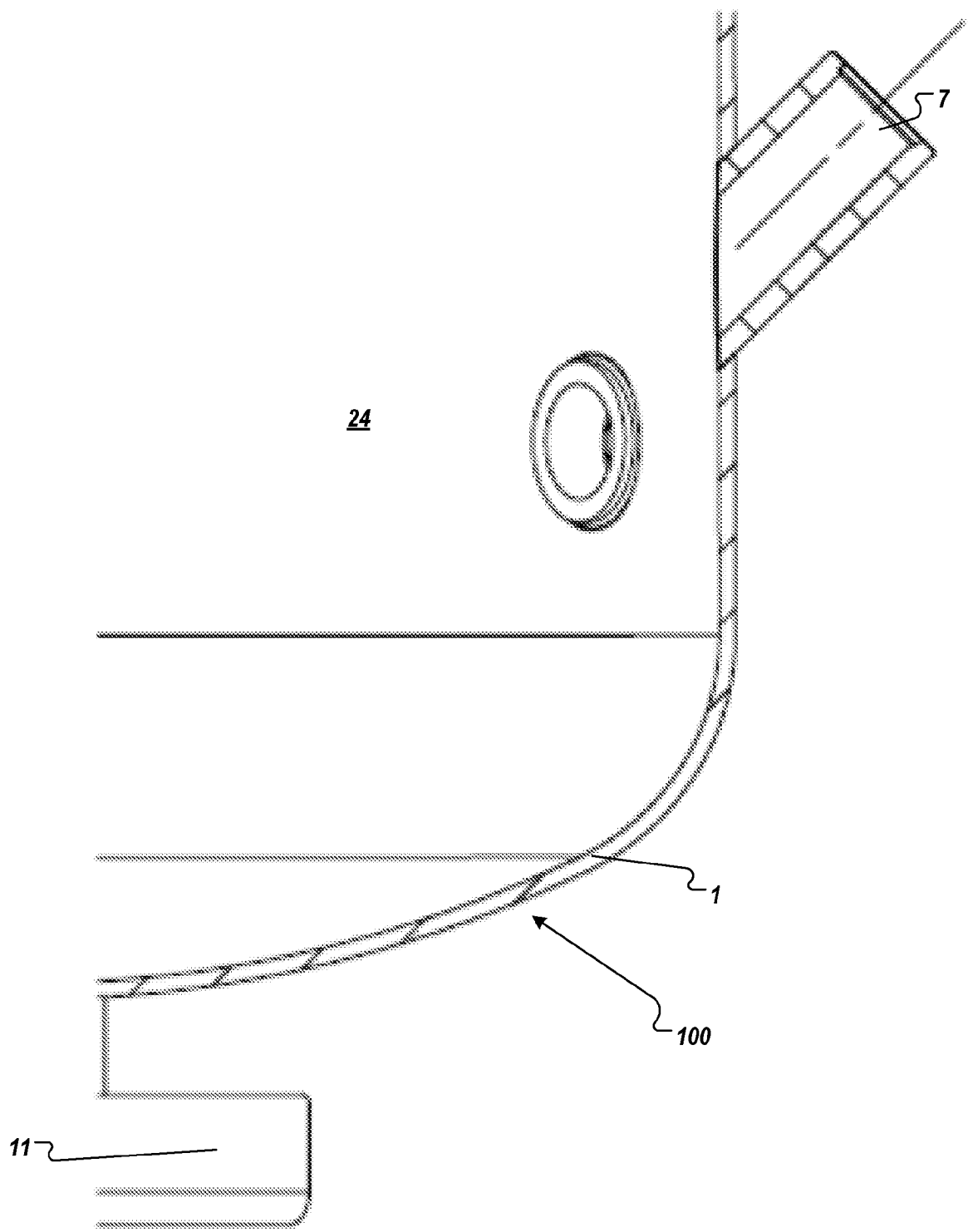
FIG. 11 is a sectional view of the separator tank taken along plane XI-XI' of FIG. 10.
Figure 12:
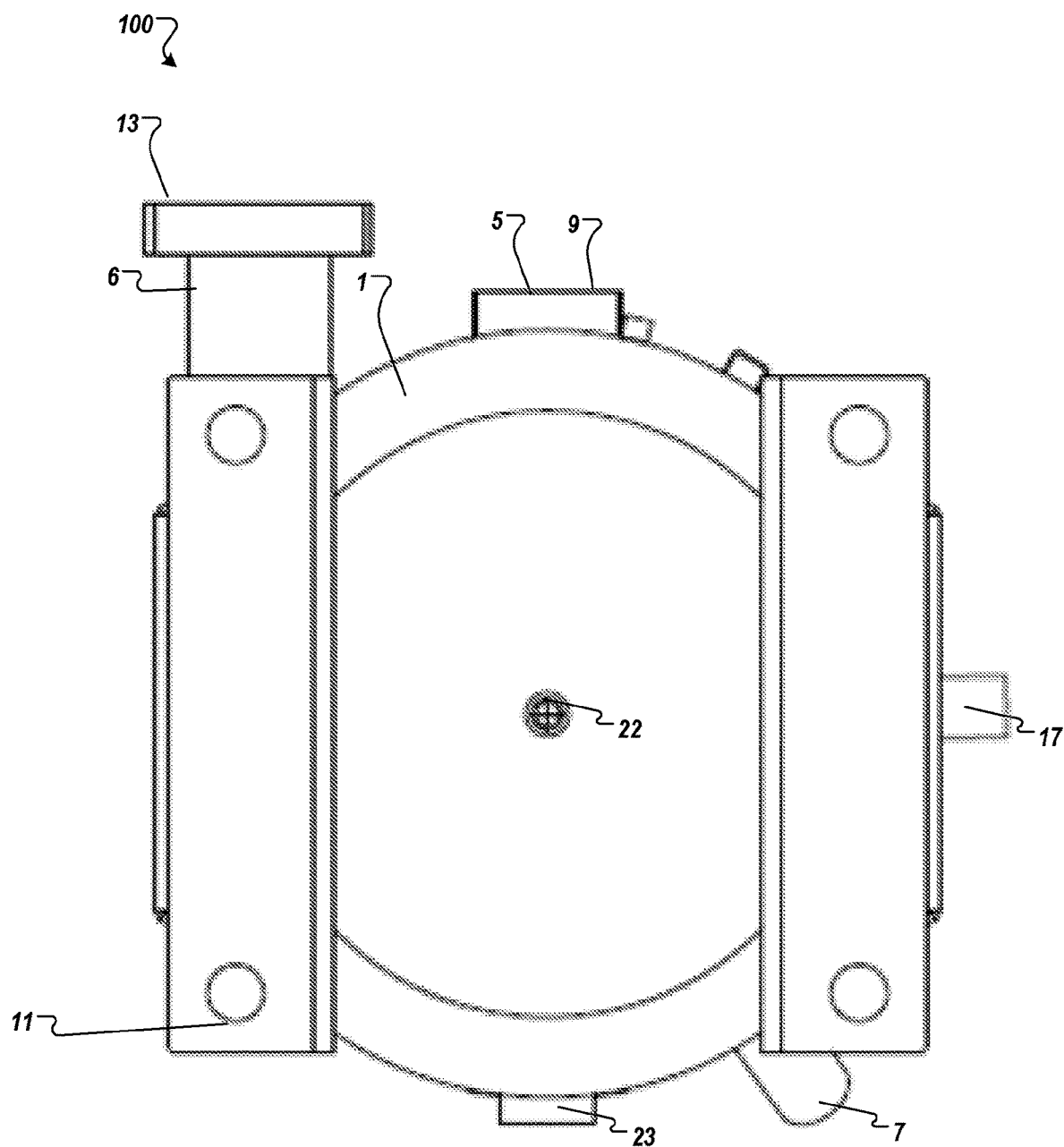
FIG. 12 is a bottom view illustrating the separator tank in accordance with the example implementation of FIG. 1.

FIGS. 1-12 illustrate various views of a separator tank 100 in accordance with example implementations of the present application. Specifically, FIGS. 1 and 2 are perspective views (exploded and unexploded views, respectively) generally illustrating a separator tank 100 in accordance with an example implementation of the present application. Further, FIGS. 3 and 5 are separate side views and FIGS. 6 and 8 are rear and front views of the separator tank 100. Additionally, FIGS. 9 and 12 are top and bottom views of the separator tank 100. Further, FIGS. 4, 7, 10 and 11 are different sectional views of the separator tank 100 taken along planes IV-IV', VII-VII', X-X' and XI-XI', respectively.

As illustrated, the separator tank 100 includes a tank body 1 enclosing or defining an inner volume 24 and a sealing plate 2 attached to the top of the tank body 1 to seal the inner volume 24. The sealing plate 2 is secured to the tank body 1 by a plurality of retaining bolts 14. Each retaining bolt is threaded through a washer 20, inserted into the sealing plate 2 and engaging a flange, for example bolt flange 3 located at an upper end of the tank body 1.

The retaining bolts 14 may be threaded bolts, riveted bolts, or any other retaining bolt structure that might be apparent to a person of ordinary skill in the art. Further the retaining bolts may have a hexagonal head, octagonal head, pentagonal head, triangular head, star head, or any other head that might be apparent to a person of ordinary skill in the art. Additionally, the retaining bolt 14 may also be a screw having a Philips head, flat head, Allen head, star head, or any other head that might be apparent to a person of ordinary skill in the art. Further, the retaining bolt may also have no head and instead may receive a nut to secure the sealing plate 2 to the tank body 1 or any other retaining structure that might be apparent to a person of ordinary skill in the art.

The tank body 1 may be provided with a plurality of inlet and outlet ports or pipes. For example, a tank inlet pipe 6 may pass through the tank body 1 to allow fluid communication between the inner volume 24 of the tank body 1 and a compressed fluid system (schematically represented as compressed fluid system 500 in FIG. 3). The tank inlet pipe 6 may include a bracket 13 to allow connection to the tank inlet pipe 6 by the compressed fluid system 500.

The compressed fluid system 500 may be a screw compressor system, rotary compressor system or any other type of fluid compression system that might be apparent to a person of ordinary skill in the art. The compressed fluid system 500 may include a compressor 505, a cooler 510 and one or more pipes 515, 520 coupling the compressed fluid system 500 and its components to separator tank 100 and the components to each other.

Additionally, an oil fill tube 7 may also pass through the tank body 1 to allow oil to be inserted or removed from the inner volume 24 of the tank body 1. The tank body 1 may also include a thermostatic balancing valve 9 that controls flow through an oil suction tube or sump tube 5 located within the inner volume 24. As illustrated in FIG. 7, the oil suction tube or sump tube 5 may have a vertically oriented opening 27 to allow oil to flow into the sump tube 5. The circulation of the oil within the tank is discussed in greater detail below with respect to the comparative example of FIGS. 13A-14B and the example implementation of FIGS. 15A-16B. The tank body 1 may be connected to the compressed fluid system 500 through the thermostatic balancing valve 9 to control oil flow into the compressed fluid system 500.

The tank body 1 may also include one or more pipe couplings (e.g., pipe coupling 17, pipe coupling 18, pipe coupling 22, and pipe coupling 23). These pipe couplings 17, 18, 22, and 23 may allow for the injection or removal of air, oil, or any other working fluid that may be involved in the operation or usage of the separator tank 100. For example, coupling 22 may be used to drain oil from the inner volume 24 of the tank body 1. Further, coupling 23 may use an overflow coupling to keep the oil level from rising too high and contacting a filter or separator element 4 located in the inner volume 24 of the tank body 1.

The exterior of the tank body 1 may also include one or more mounting clips 10, 12 to allow external equipment, tools, signage 8, or measurement devices to be mounted on the separator tank 100 without piercing the tank body 1.

The tank body 1 may sit on a tank support structure 11. For example, the tank support structure 11 may be metal legs or struts located underneath the tank. The tank support structure 11 may provide clearance underneath the separator tank 100. Additionally, the tank support structure 11 may also provide a structure to secure a separator tank 100 to a facility floor. For example, bolts, screws, rivets or other anchoring mechanisms may be driven through the tank support structure 11 and into a facility floor to prevent tipping or rocking of the tank body 1.

As mentioned above, the separator tank 100 may be used to separate lubricating fluid (e.g., oil) from a compression fluid (e.g., air) in a compressor installation. This may be done using a filter or separator element 4 located within the inner volume 24 of the tank body 1. For example, mixed fluid (e.g., oil and air) may enter into the separator tank 100 through the tank inlet pipe 6 and the separator element 4 to stop oil and cause the oil to pool or collect at the bottom of the pipe, while allowing air to pass through the separator element 4 and enter the inner volume 25 of the separator element 4.

Over time the separator element 4 may become clogged or fouled such that cleaning, repair, or replacement of the separator element 4 may be required. In order to access the inner volume 24 of the tank body 1, the sealing plate 2 must be removed from the tank body 1. This may be done by first removing all of the retaining bolts 14 from the sealing plate 2. Once the retaining bolts 14 are removed, the sealing plate 2 can be lifted off of the tank body 1.

Figure 13A:
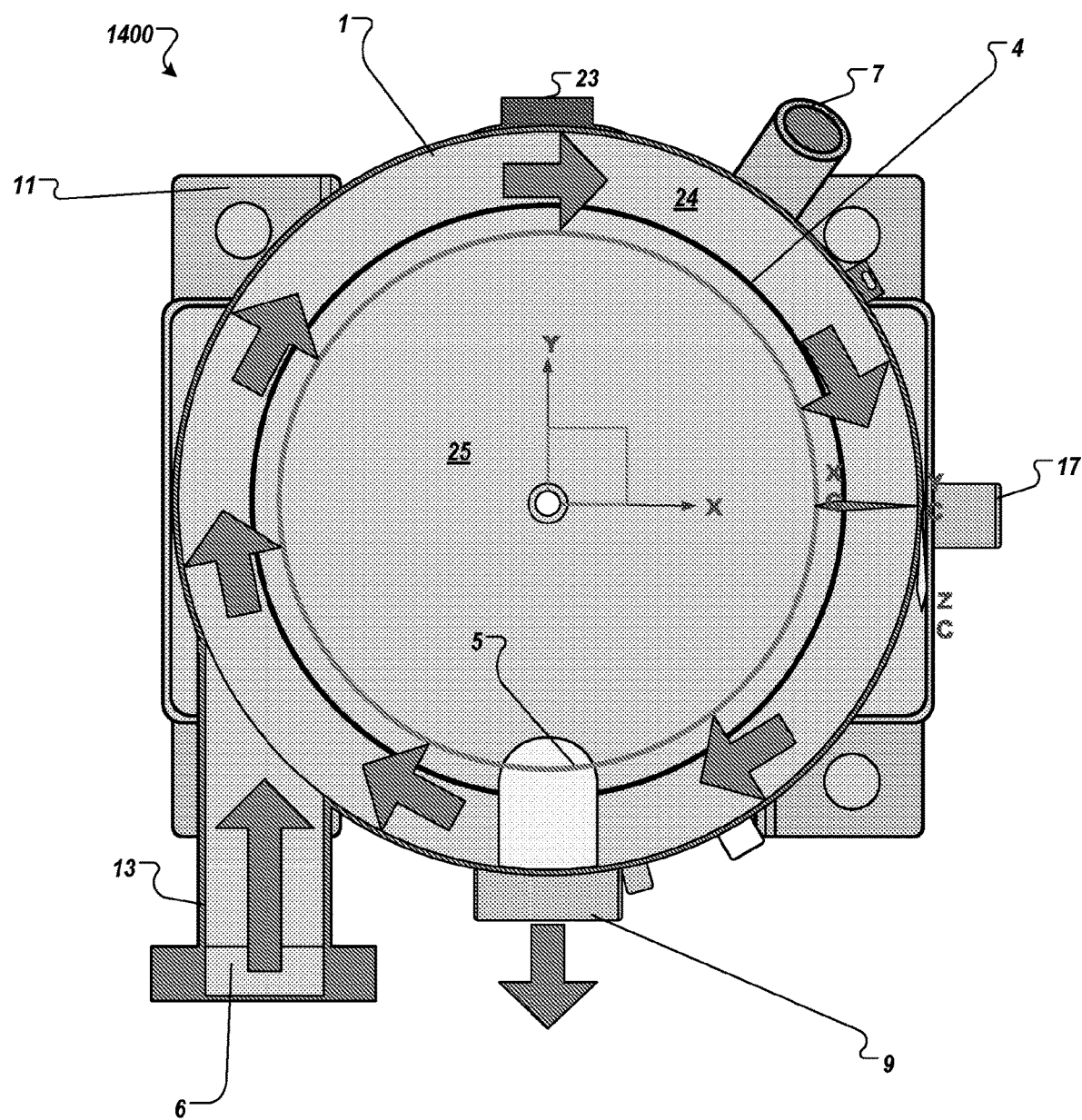
FIGS. 13A-13B illustrate internal top views of the oil spinning in a comparative example of a related art separator tank.
Figure 13B:
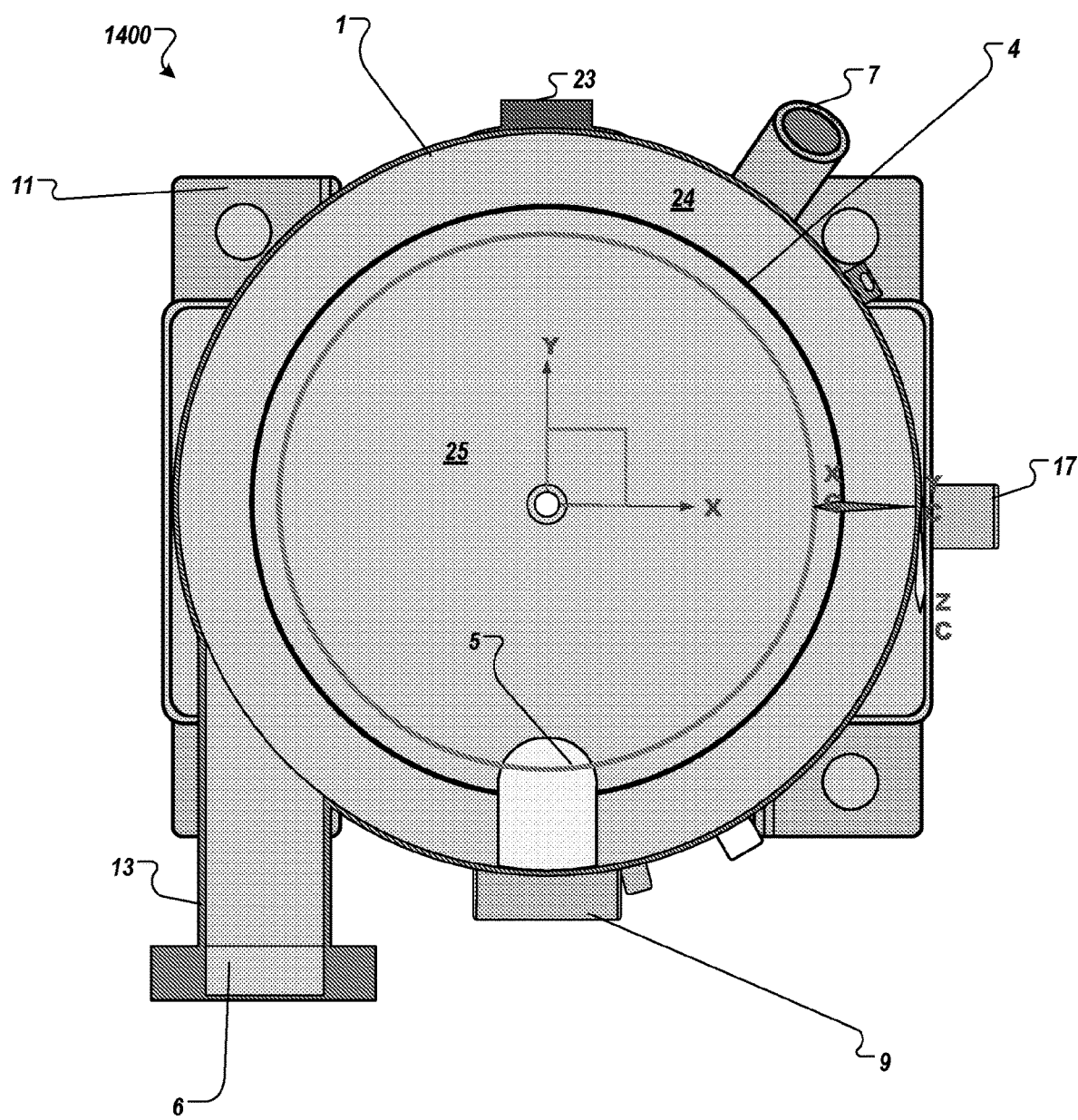
Figure 14A:
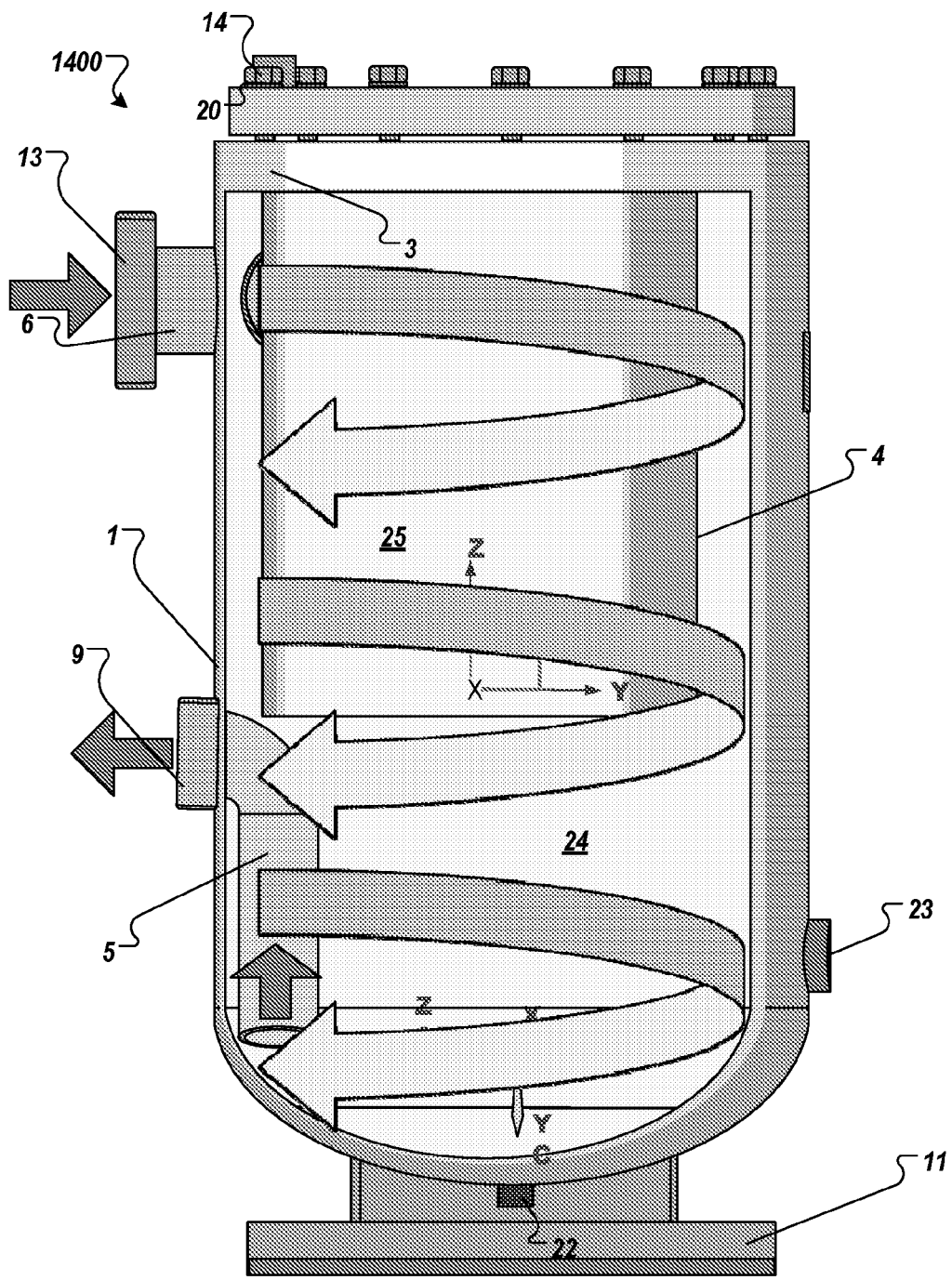
FIGS. 14A-14B illustrate internal side views of the oil spinning in a comparative example of the related art separator tank.
Figure 14B:
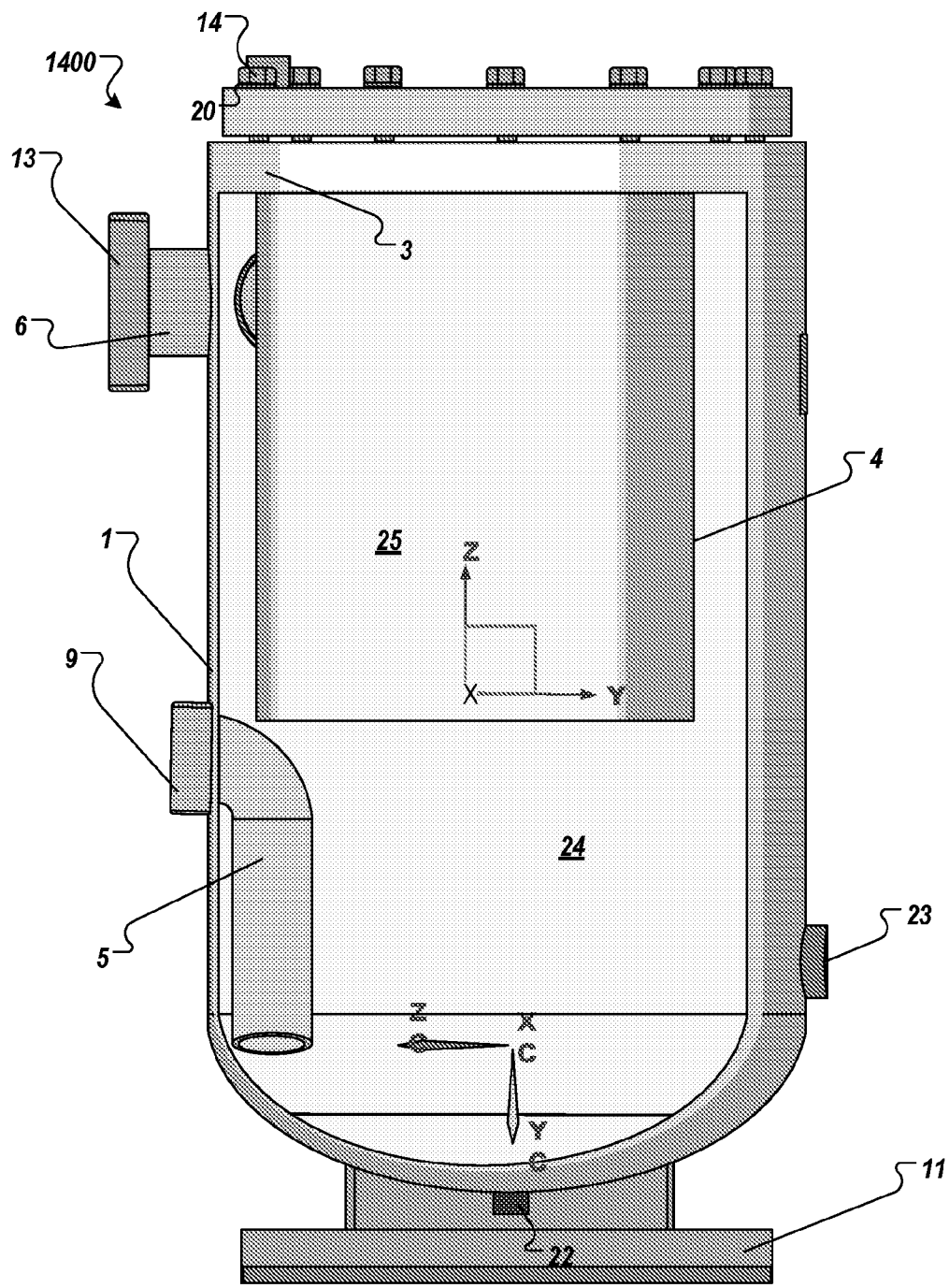

As described above, in the related separation tank implementations, separation of the compressed gas from the liquid oil may be done using a first stage of separation relying on centrifugal force of the oil spinning around the circumference of the cylindrical separation tank. FIGS. 13A-13B illustrate internal top views of the oil spinning in a comparative example of a related art separator tank 1400. FIGS. 14A-14B illustrate internal side views of the oil spinning in a comparative example of the related art separator tank 1400. As illustrated in the FIGS. 13A, 13B, 14A, and 14B (discussed in greater detail below as a comparative example), a combined fluid stream of compressed gas and lubricating oil enters the cylindrical tank body 1 of the related art separator tank 1400 via tank inlet pipe 6. As the tank inlet pipe 6 intersects the tank body 1 tangentially, the combined fluid stream (represented by arrows in FIGS. 13A and 14A) spirals tangentially around the curvature of the tank body 1. The centripetal action causes the heavier oil to move radially outward within the inner volume 24 of the tank body 1, while the lighter air moves radially into the interior volume 25 of the separator element 4. The separator element 4 may provide a second stage filtration to separate the compressed gas from the oil. The oil, which is heavier than the gas, drops to the bottom of the tank body 1 due to gravitation force and is collected by an opening located at the bottom of the vertical sump tube 5 to be recirculated to a compressor system. However, in the related art systems there is a drop in oil pressure as oil pools or collects in the bottom of the tank body 1 because the oil is being slowed to a static pool before being collected by the sump tube 5 for circulation. This causes a loss of significant kinetic energy as the oil pools or collects and is withdrawn through the vertical sump tube 5 in the bottom of the tank 1400.

Figure 15A:
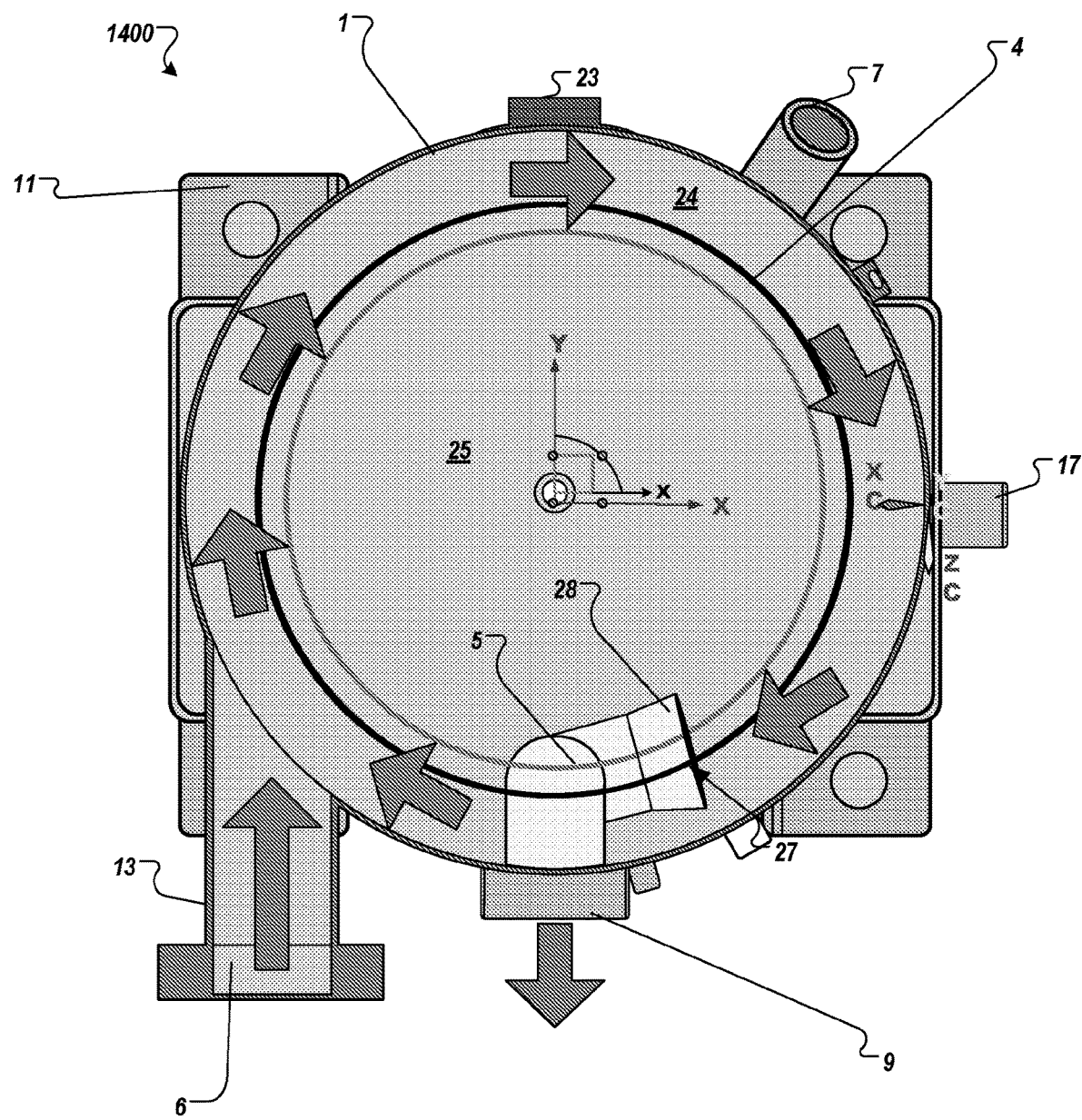
FIGS. 15A-15B illustrate internal top views of the oil spinning in a separator tank according to an example implementation of the present application.
Figure 15B:
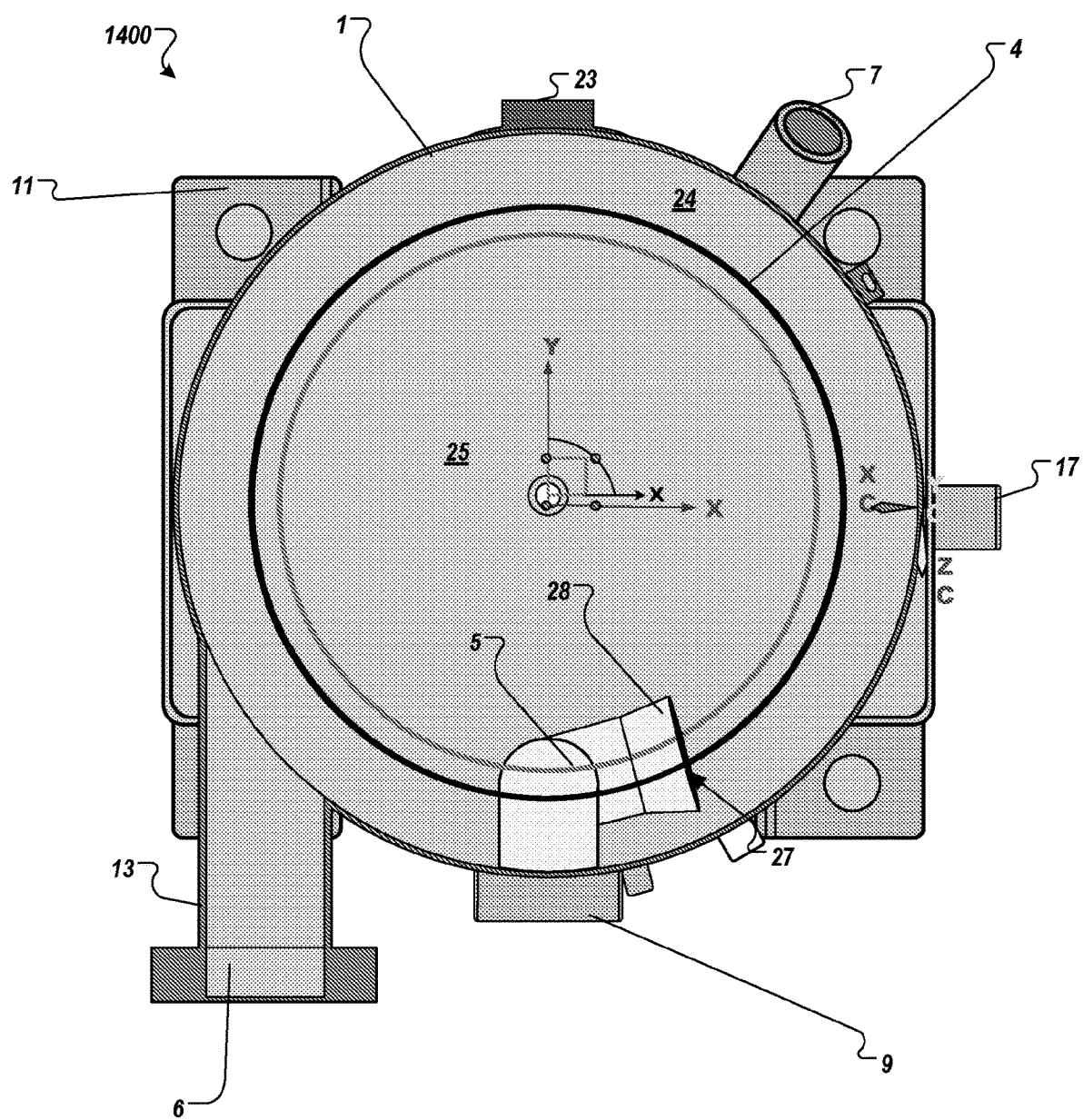
Figure 16A:
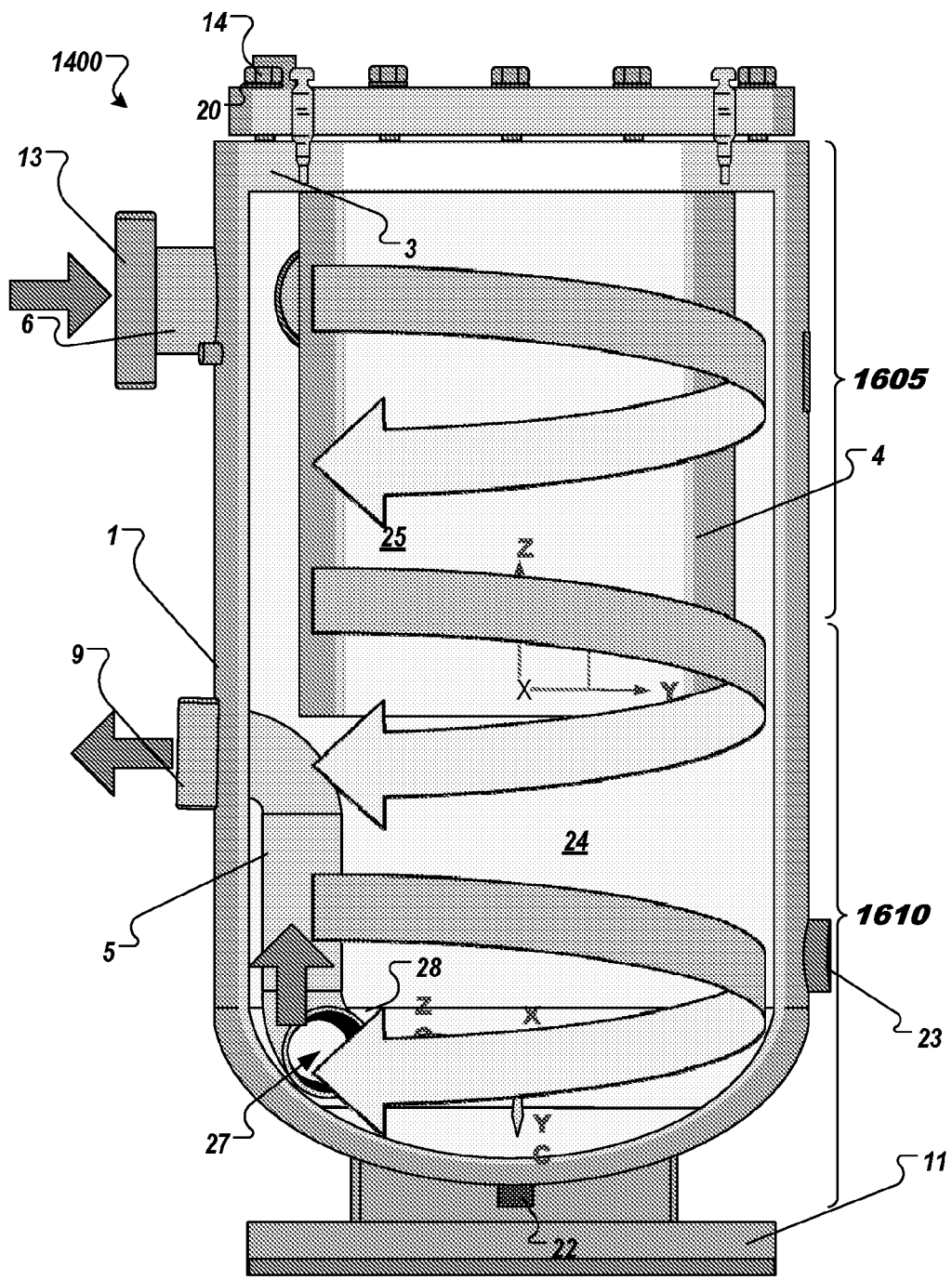
FIGS. 16A-16B illustrate internal side views of the oil spinning in a separator tank according to an example implementation of the present application.
Figure 16B:
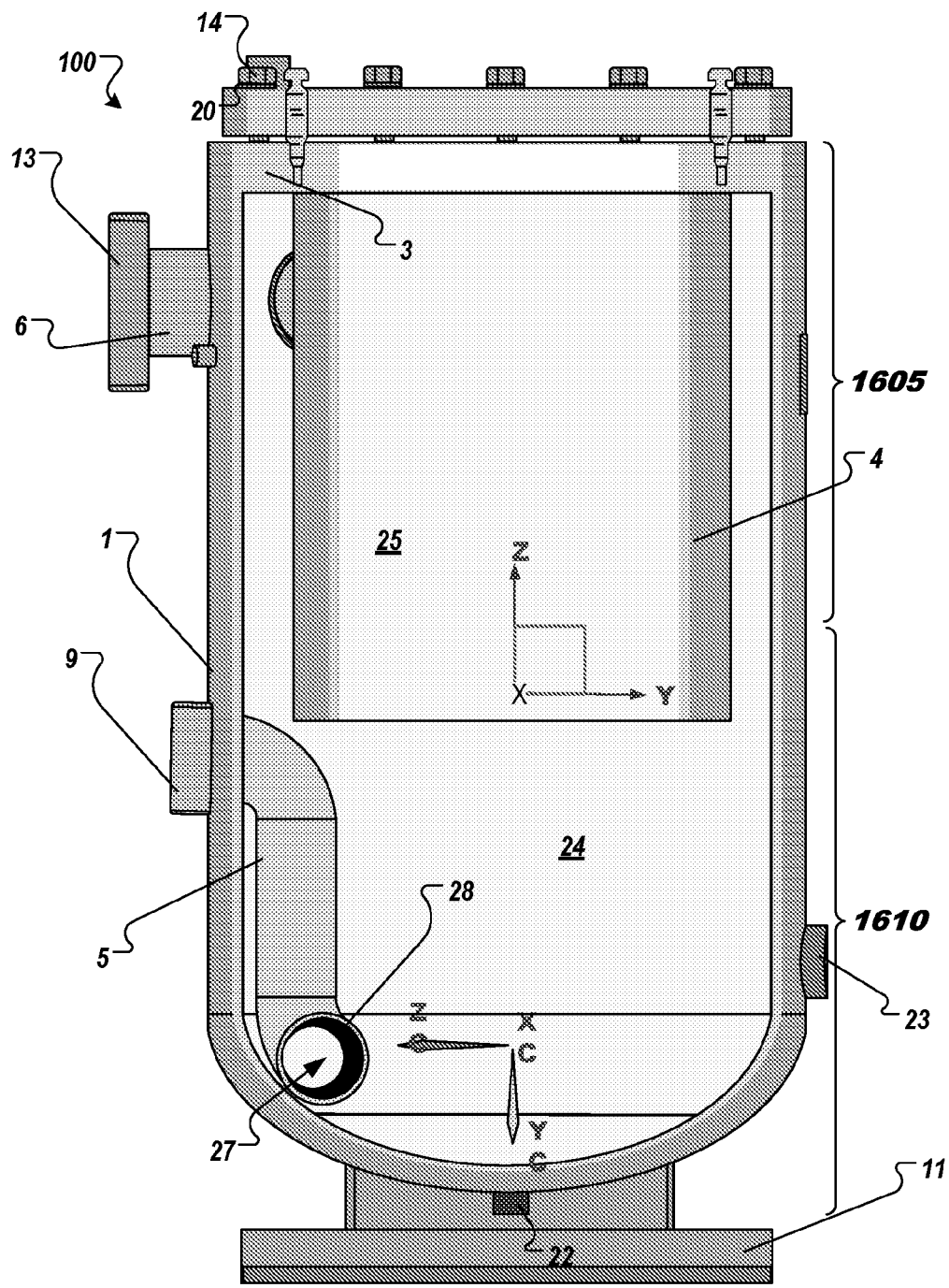

Conversely, example implementations of the present disclosure may avoid the pressure loss by converting the kinetic energy of the spiraling oil flow into potential energy and providing increased oil pressure exiting the tank body 1. FIGS. 15A-15B illustrate internal top views of the oil spinning in the separator tank 100 according to an example implementation of the present application. FIGS. 16A-16B illustrate internal side views of the oil spinning in a separator tank 100 according to an example implementation of the present application.

As illustrated in FIGS. 15A-16B, the sump tube 5 of the separator tank 100 of the example implementation includes a vertically oriented opening 27 that allows the tangentially spiraling oil to enter the sump tube 5 and be collected by the sump tube 5 without having to come to a static rest in a pool at the bottom of the tank body 1. More specifically, the vertically oriented opening 27 is oriented to align with a tangential fluid flow direction created by the tank inlet pipe 6 tangentially penetrating the tank body 1.

For example, the tank inlet pipe 6 may tangentially penetrate the tank body 1 and be oriented to provide a fluid flow pathway such that fluid (e.g., gas and/or oil) entering the tank is directed to spiral within the tank body 1 in a clockwise direction, and the vertically oriented opening 27 may be oriented to receive or capture the clockwise spiral of oil (e.g., be opened toward a counter-clockwise direction as illustrated in FIGS. 15A and 15B) such that oil can flow directly into the vertically oriented opening 27. Similarly, the tank inlet pipe 6 may tangentially penetrate the tank body 1 and be oriented to provide a fluid flow pathway such that fluid (e.g., gas and/or oil) entering the tank is directed to spiral within the tank body 1 in a counter-clockwise direction, and the vertically oriented opening 27 may be oriented to receive or capture the counter-clockwise spiral of oil (e.g., be opened toward a clockwise direction) such that oil can flow directly into the vertically oriented opening 27.

In some example implementations, the separator element 4 may be positioned such that the fluid flow pathway may be located between the separator element 4 and the tank body 1. Further, in some example implementations, the vertically oriented opening 27 may be positioned vertically within the tank body 1 below the separator element 4.

Additionally, the vertically oriented opening 27 may be vertically offset from the tank inlet pipe 6 such that a head pressure differential exists between the vertically oriented opening 27 and the tank inlet pipe 6. For example, the tank inlet pipe 6 may be positioned at an upper region (e.g., upper half 1605) of the tank body 1 and the vertically oriented opening 27 may be located in a lower region (e.g., lower half 1610) of tank body 1. Additionally, in some example implementations, the vertically oriented opening 27 may be located below a minimum oil level of the tank body 1. For example, the vertically oriented opening 27 may be positioned within the inner volume 24 of the tank body 1 such that vertically oriented opening 27 is constantly submerged below the oil level of the tank 100 to avoid the sump tube 5 sucking air.

Additionally, in some example implementations, the sump tube 5 may have a chamfered or angled region 28 surrounding the vertically oriented opening 27 to form a funnel shape allowing a wide oil flow stream to enter the vertically oriented opening 27 and slightly compress as it flows into and up the sump tube 5. In other words, the chamfered region 28 provides a wider (e.g., larger diameter) region of the sump tube 5 at the vertically oriented opening 27 and a narrower (e.g., smaller diameter) region of the sump tube 5 downstream of the vertically oriented opening 27.

By providing the sump tube 5 with the vertically oriented opening 27 as illustrated, the kinetic energy of the oil stream flow may be captured and converted into potential energy by flowing up the sump tube 5.

The foregoing detailed description has set forth various example implementations of the devices and/or processes via the use of diagrams, schematics, and examples. Insofar as such diagrams, schematics, and examples contain one or more functions and/or operations, each function and/or operation within such diagrams or examples can be implemented, individually and/or collectively, by a wide range of structures. While certain example implementations have been described, these implementations have been presented by way of example only, and are not intended to limit the scope of the protection. Indeed, the novel methods and apparatuses described herein may be embodied in a variety of other forms. Furthermore, various omissions, substitutions and changes in the form of the devices and systems described herein may be made without departing from the spirit of the protection. The accompanying claims and their equivalents are intended to cover such forms or modifications as would fall within the scope and spirit of the protection.

What is claimed:

1. A separator tank for a gas compressor, the separator tank comprising:
   a tank body defining an inner volume;
   a tank inlet pipe providing fluid communication with the inner volume of tank body, wherein the tank inlet pipe tangentially penetrates the tank body and is oriented to direct fluid entering the tank body in a spiral fluid flow pathway; and
   a sump tube positioned to collect fluid flowing within the tank body, the sump tube comprising a vertically oriented opening oriented to align and capture fluid flowing along the spiral fluid flow pathway.

2. The separator tank of claim 1, wherein the sump tube includes a chamfered region surrounding the vertically oriented opening that forms a funnel shape to allow fluid to enter the vertically oriented opening and compress as fluid flows into the sump tube.

3. The separator tank of claim 1, wherein the vertically oriented opening of the sump tube is vertically offset from the tank inlet pipe.

4. The separator tank of claim 3, wherein the tank inlet pipe is located in an upper half of the tank body; and
   wherein the vertically oriented opening is located in a lower half of the tank body.

5. The separator tank of claim 1, further comprising a separator element located within the inner volume defined by the tank body, wherein the separator element is positioned within the tank body such that the spiral fluid flow pathway is located between the separator element and the tank body.

6. The separator tank of claim 5, wherein the vertically oriented opening is positioned within the tank body vertically below the separator element.

7. A fluid compression system comprising:
   a gas compressor; and
   a separator tank fluidly communicating with the gas compressor, the separator tank comprising:
   a tank body defining an inner volume;
   a tank inlet pipe providing fluid communication between the gas compressor and the inner volume of the tank body, wherein the tank inlet pipe tangentially penetrates the tank body and is oriented to direct fluid entering the tank body in a spiral fluid flow pathway; and
   a sump tube positioned to collect fluid flowing within the tank body, the sump tube comprising a vertically oriented opening oriented to align and capture fluid flowing along the spiral fluid flow pathway.

8. The fluid compression system of claim 7, wherein the sump tube includes a chamfered region surrounding the vertically oriented opening that forms a funnel shape to allow fluid to enter the vertically oriented opening and compress as fluid flows into the sump tube.

9. The fluid compression system of claim 7, wherein the vertically oriented opening of the sump tube is vertically offset from the tank inlet pipe.

10. The fluid compression system of claim 9, wherein the tank inlet pipe is located in an upper half of the tank body; and
    wherein the vertically oriented opening is located in a lower half of the tank body.

11. The fluid compression system of claim 7, further comprising a separator element located within the inner volume defined by the tank body, wherein the separator element is positioned within the tank body such that the spiral fluid flow pathway is located between the separator element and the tank body.

12. The fluid compression system of claim 11, wherein the vertically oriented opening is positioned within the tank body vertically below the separator element.

* * * * *